Figure 16:
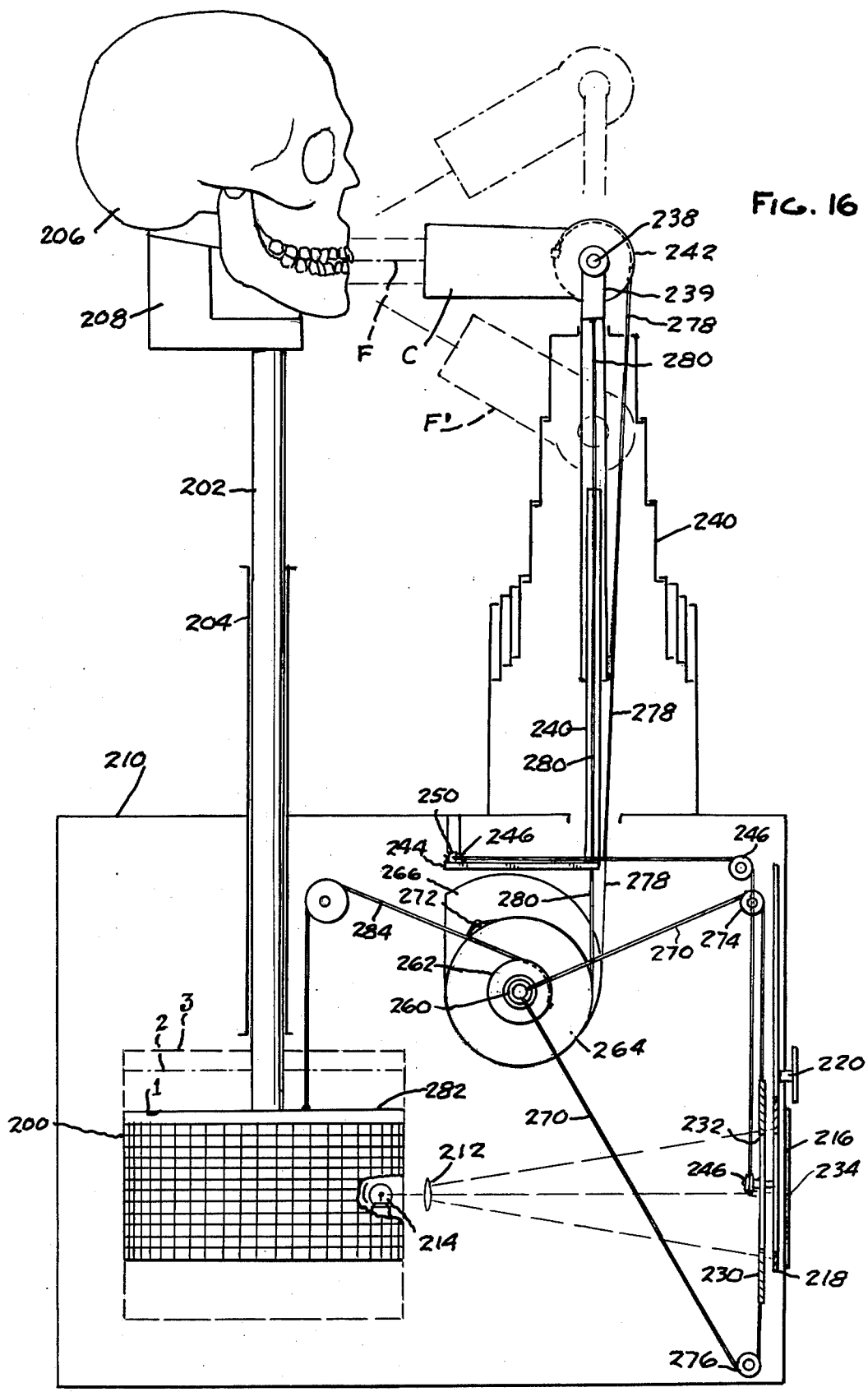

United States Patent [19]
Richards

[11] 4,200,996
[45] May 6, 1980

[54] TEACHING DEVICE AND METHOD FOR DENTAL X-RAY TECHNIQUES

[76] Inventor: Albert G. Richards, 395 Rock Creek Dr., Ann Arbor, Mich. 48104

[21] Appl. No.: 926,909

[22] Filed: Jul. 21, 1978

[51] Int. Cl.² .............................................. G09B 23/28
[52] U.S. Cl. ....................................................... 35/17
[58] Field of Search ................................ 35/17; 32/71

[56] References Cited

U.S. PATENT DOCUMENTS

| | | | |
|---|---|---|---|
| 3,348,319 | 10/1967 | Harrison | 35/17 |
| 3,487,559 | 1/1970 | Freedman | 35/17 |
| 3,520,060 | 7/1970 | Crabtree et al. | 35/17 |
| 3,624,942 | 12/1971 | Klohr | 35/17 |
| 3,775,867 | 12/1973 | Christenberry, Jr. | 35/17 |
| 4,012,850 | 3/1977 | Keith | 35/17 |

Primary Examiner—Louis G. Mancene
Assistant Examiner—John J. Wilson
Attorney, Agent, or Firm—Barnes, Kisselle, Raisch & Choate

[57] ABSTRACT

A device for teaching dental students and technicians how to adjust and position an X-ray cone relative to the upper or lower jaw of a patient to achieve a proper angle and maximum clarity for the particular purpose for which the X-ray picture is being taken which includes a simulated jaw or human head bearing teeth and a simulated X-ray cone together with miniaturized X-ray film images or projection slides of X-ray films, to be positioned and illuminated on demand, each picture appearing in response to a student selected particular position of the simulated cone relative to the jaw to show whether the cone is properly positioned. These X-ray pictures are made of a human skull. The simulated patient is a plastic reproduction of the original skull.

18 Claims, 25 Drawing Figures

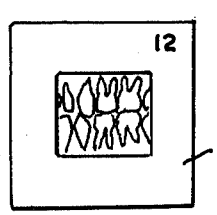
FIG. 2
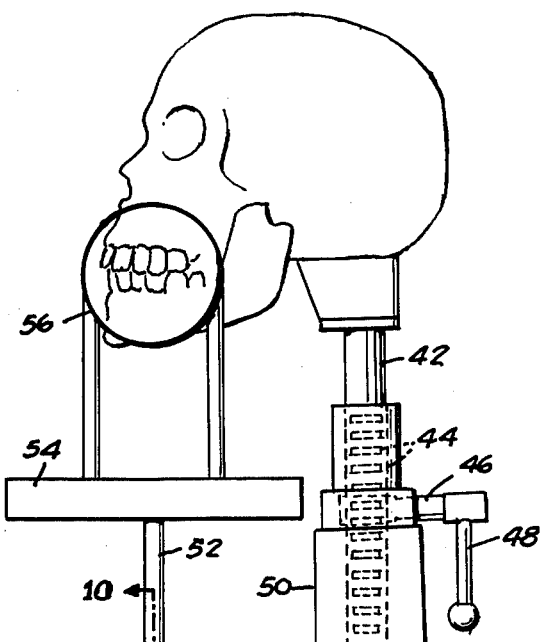
FIG. 1
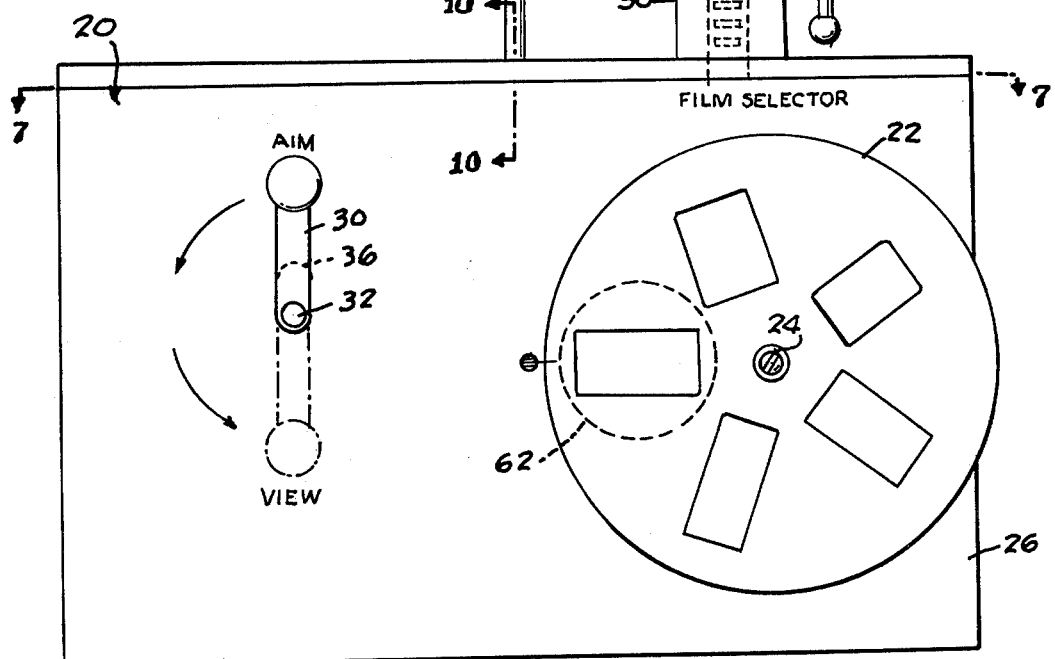
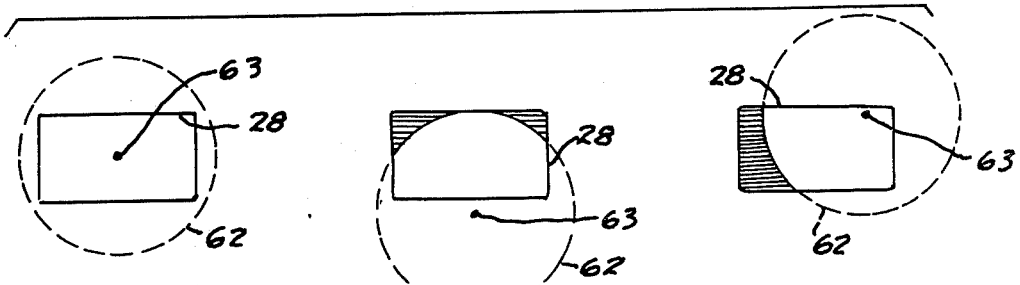
FIG. 3   FIG. 4   FIG. 5

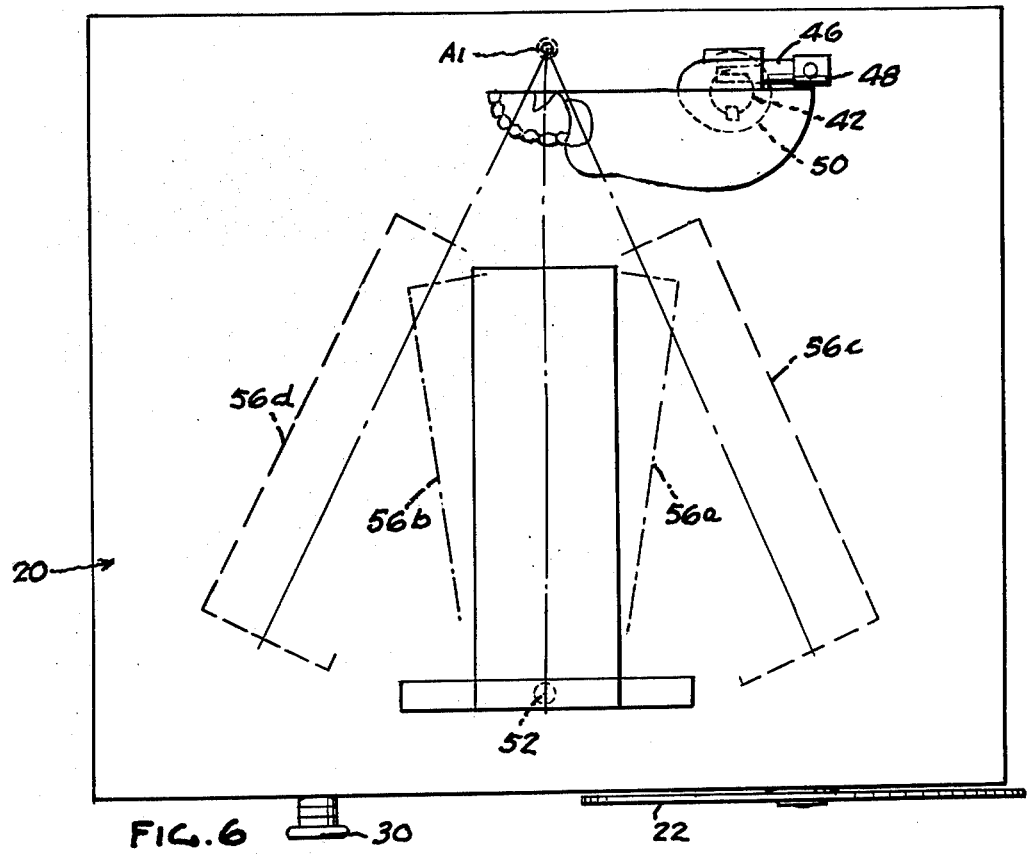
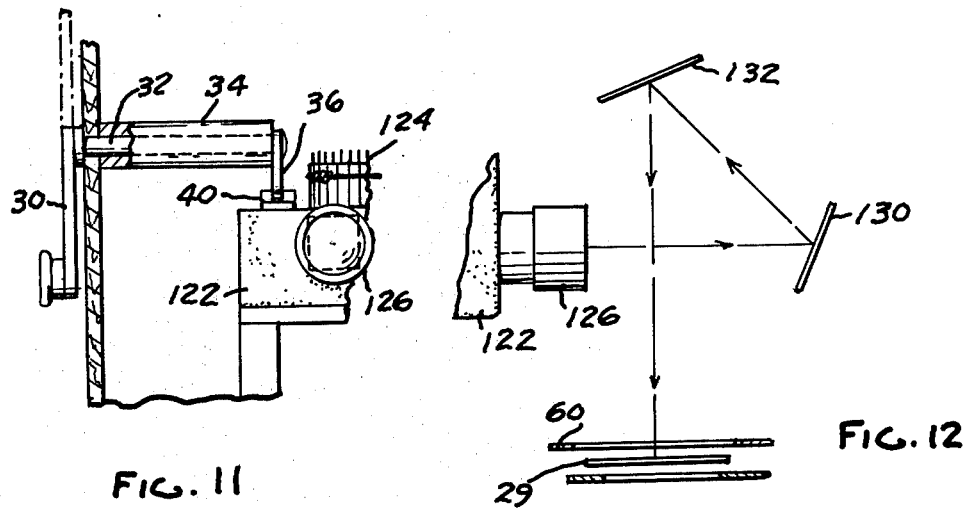

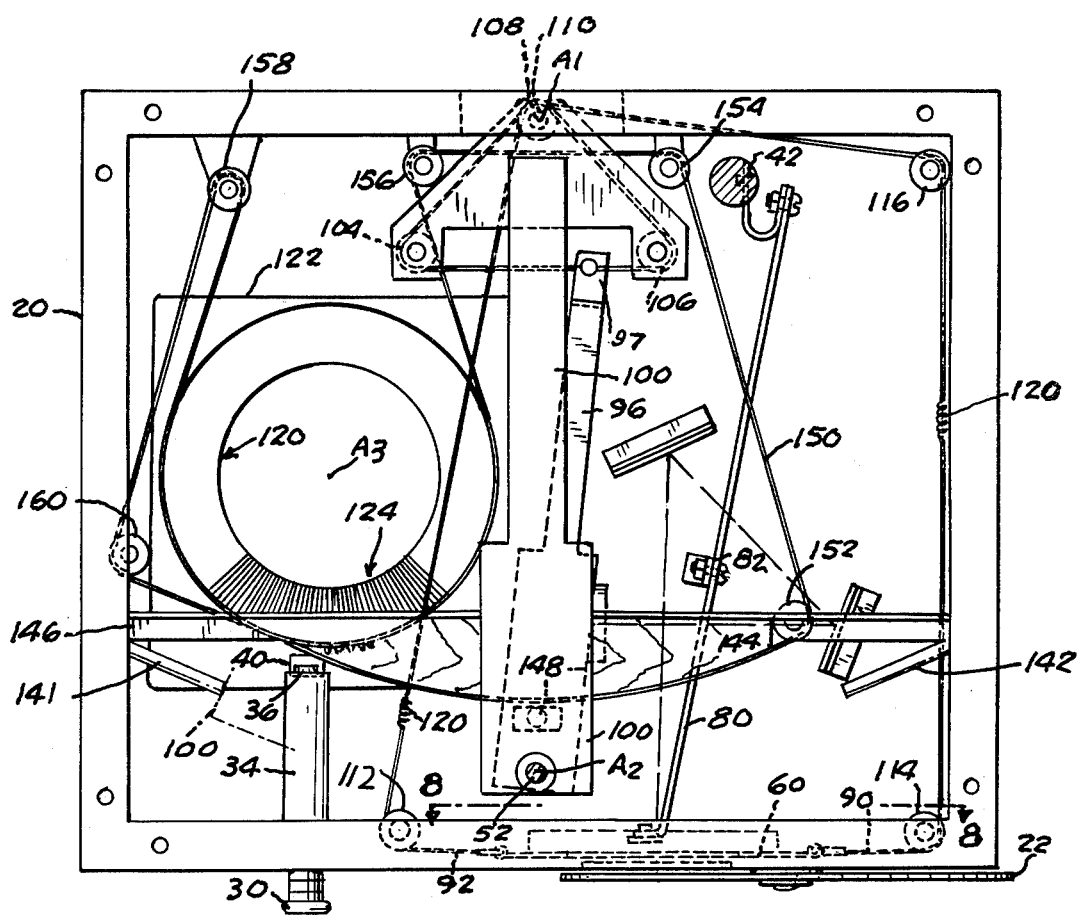

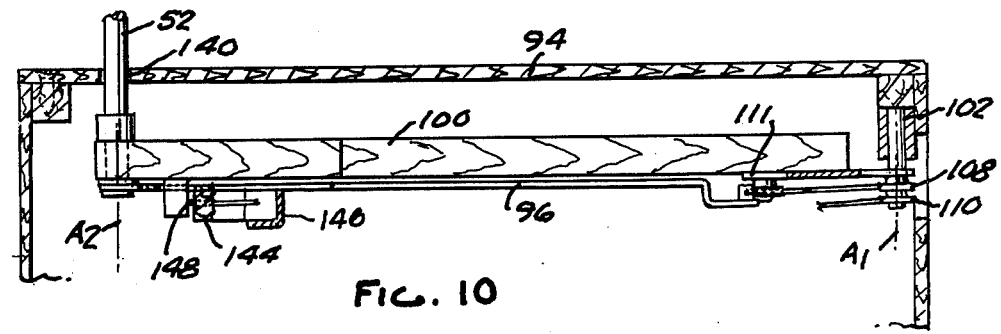
FIG. 10
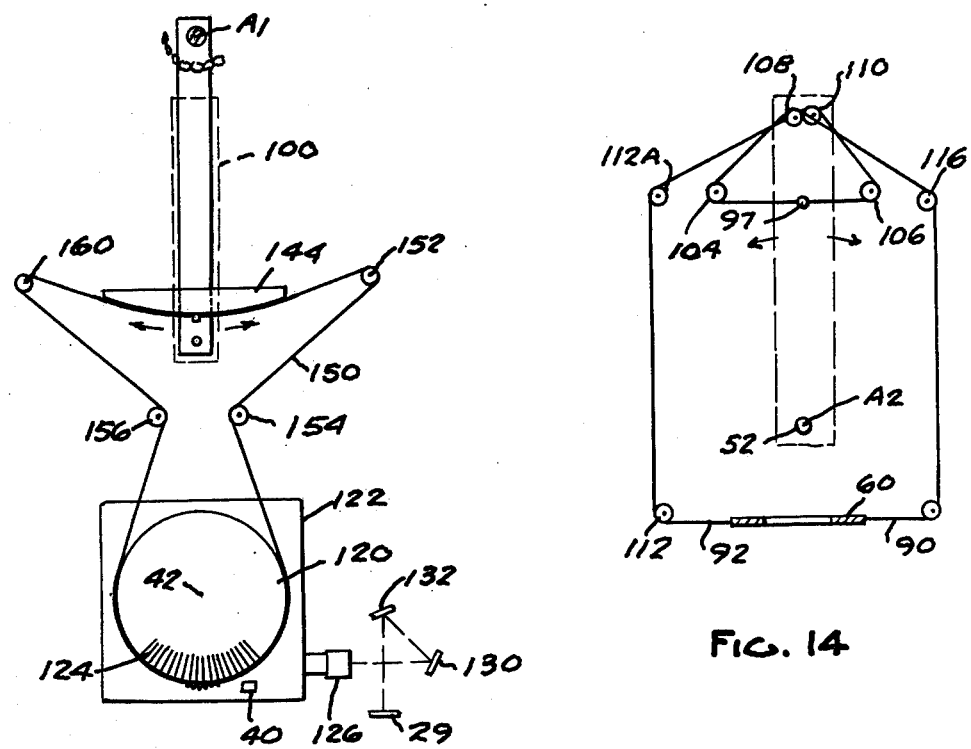
FIG. 13
FIG. 14

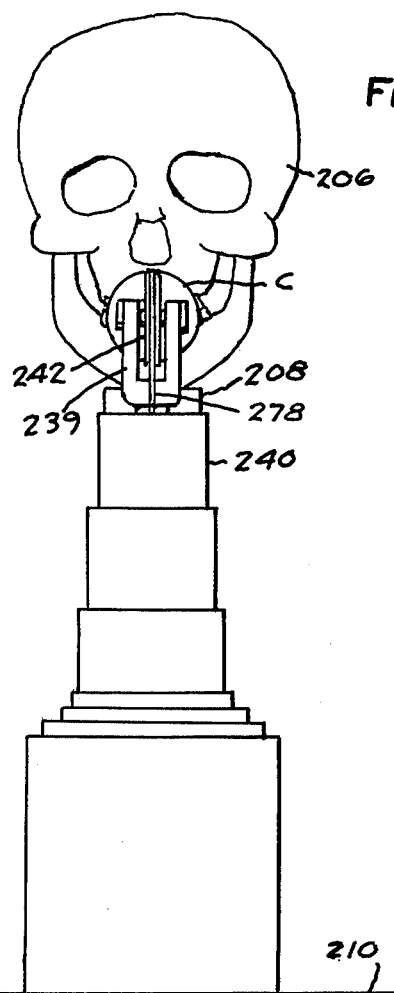
FIG. 17
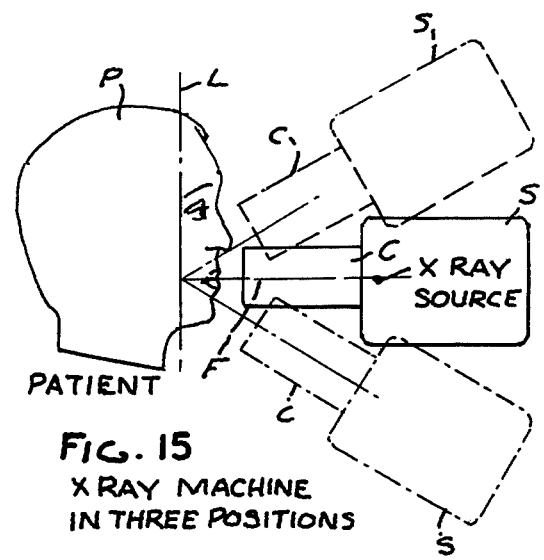
FIG. 15
X RAY MACHINE IN THREE POSITIONS
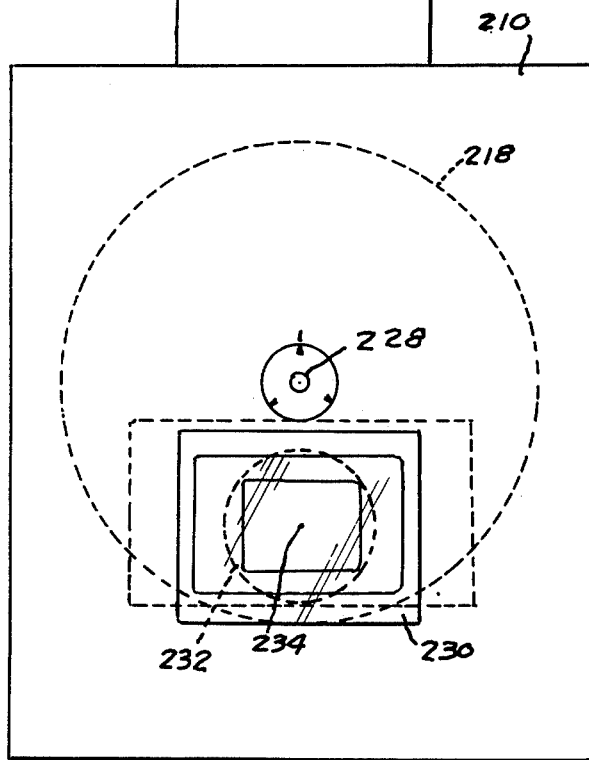
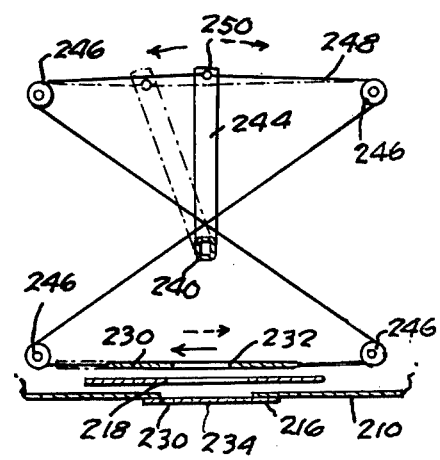
FIG. 18

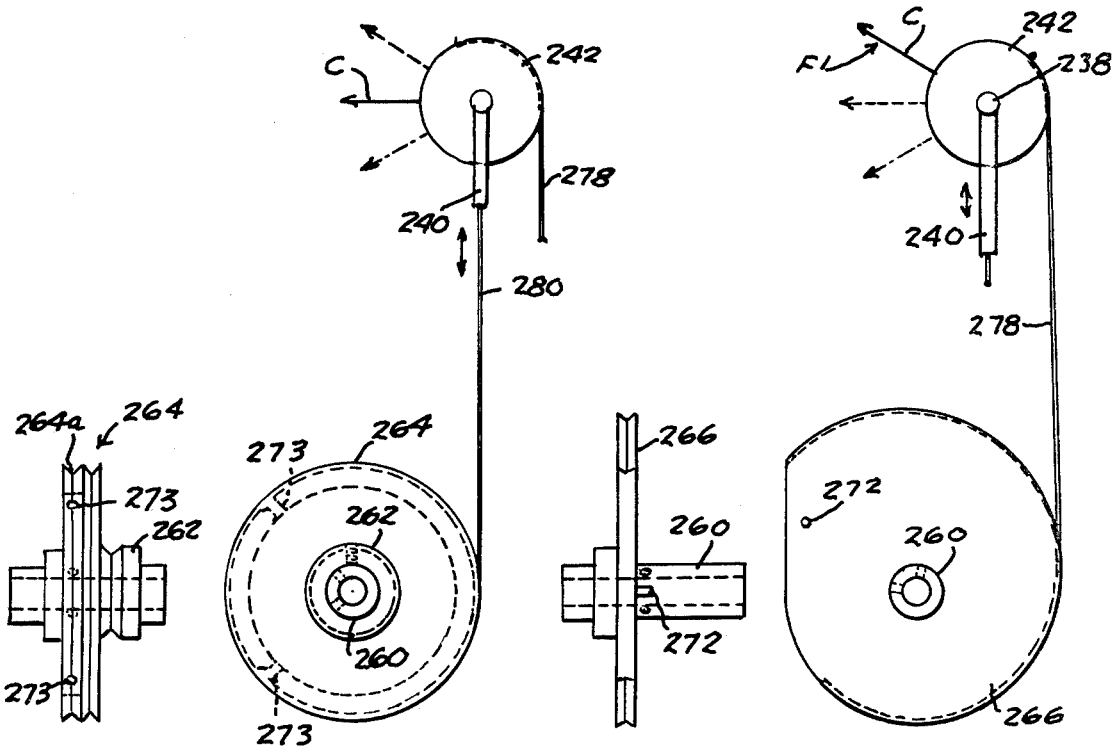
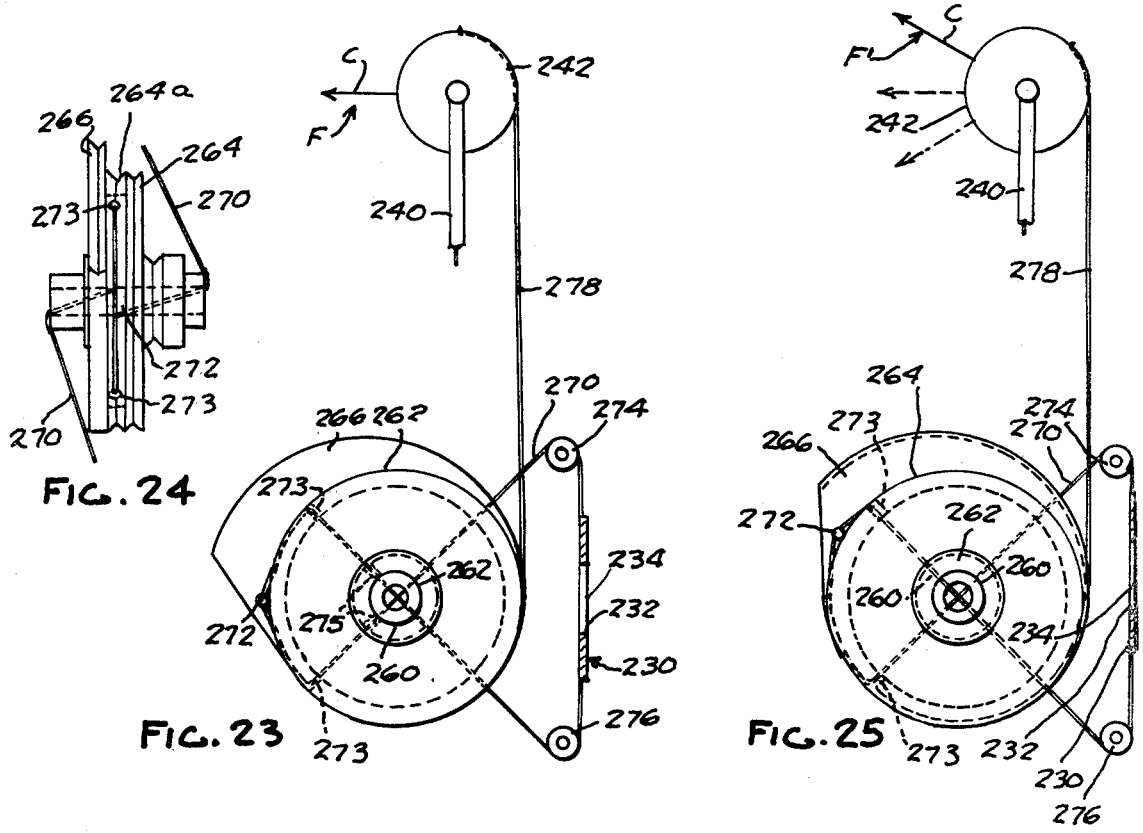

TEACHING DEVICE AND METHOD FOR DENTAL X-RAY TECHNIQUES

This invention is directed to a Teaching Device for Dental X-Ray Techniques and more particularly to an apparatus for teaching dental students and, in some cases, medical students, technicians, and X-ray personnel, how to position an X-ray cone relative to a portion of the human body to achieve the best results in an X-ray picture.

An X-ray cone, when properly positioned with respect to the human jaw, for example, will produce images on a radiograph that will show a clear line of demarcation between the teeth being exposed and this will provide the maximum information relative to the existence of dental caries. Similarly, when the root of a tooth is being checked, it is important to have the proper angle of the X-ray cone relative to the plane of the film and the long axis of the tooth.

It has been the practice to teach X-ray skills using human patients, but this has disadvantages since patients are not always available and improper or faulty pictures require retakes of the pictures which may lead to unnecessary and, perhaps, harmful exposure of the patient to the X-rays. In addition, X-ray film and equipment are expensive, and when a number of students are being taught, either a large array of X-ray machines must be on hand or the teaching must proceed slowly to give each student an opportunity to perfect the skill necessary for professional practice.

It is, therefore, an object of the present invention to provide a relatively inexpensive training apparatus which need not utilize X-rays, but which can provide an effective tool to teach a student how to select and position a film packet of proper film size and shape in the patient's mouth, and how to position and aim an X-ray cone relative to the human head without the need of live patients. Thus, an adequate number of teaching devices may be made available at a fraction of the cost of one X-ray machine. This results in a material savings since it eliminates the necessity of a live patient, it eliminates also the ionizing radiation, the X-ray film, the processing facilities, the lead-lined room, an expensive dental chair, and the X-ray generator. The present invention permits instant feedback and allows the student to observe the relationship of the X-ray cone to the subject, the film position, and the image so an analysis can be made of the error before the next attempt at a proper positioning.

Other objects and features of the invention will be apparent in the following description and claims in which the principles of the invention are set forth together with details of specific examples of apparatus to teach those skilled in the art to practice the invention all in connection with the best modes presently contemplated for the invention.

DRAWINGS accompany the disclosure and the various views thereof may be briefly described as:

FIG. 1, a front elevation of one embodiment of the device.

FIG. 2, a view of a processed X-ray film.

FIGS. 3, 4 and 5, illustrations of correct, low, and offside alignment of the center of the X-ray beam and the film respectively.

FIG. 6, a top view of the first embodiment.

FIG. 7, a top view of the interior mechanism of the first embodiment on line 7—7 of FIG. 1.

FIG. 8, a sectional view on line 8—8 of FIG. 7.

FIG. 9, a side elevation of the vertical control for the subject and mask.

FIG. 10, a sectional view on line 10—10 of FIG. 1.

FIG. 11, a view of the turn on control.

FIG. 12, a diagrammatic view of the film projector optical path.

FIG. 13, a diagram of the film tray positioner.

FIG. 14, a diagram of the horizontal control for the mask plate.

FIG. 15, a diagrammatic view of a patient and X-ray cone in three different positions.

FIG. 16, a side view of a modified trainer device utilizing microfiche film.

FIG. 17, a front view of the device of FIG. 16.

FIG. 18, a diagrammatic presentation of a response mechanism similar to that shown in FIG. 14.

FIG. 19, a view of the X-ray cone response mechanism.

FIG. 20, a side view of a pulley in the response mechanism.

FIG. 21, a view of the vertical response mechanism.

FIG. 22, an elevation of the pulleys in the vertical response mechanism.

FIG. 23, a view of the composite cone and vertical response mechanism in one position.

FIG. 24, an elevation of the combined pulley mechanism.

FIG. 25, a view of the composite cone and vertical response mechanism in a second position.

WITH REFERENCE TO THE DRAWINGS

In FIG. 1, an apparatus is illustrated composed of a box housing 20 having a rotatable disc 22 mounted on axis 24 on the outside of the front plate 26 of the housing. The disc has a plurality (five) variously sized and shaped openings to simulate the exposure area of an X-ray film, each opening being positionable in front of a film aperture opening in the front plate shown at 28 in FIG. 8 and covered by a translucent viewing screen 29. This disc can be used to demonstrate faulty position of the film packet in the patient's mouth.

On the front plate 26, a lever 30 is mounted to pivot at 32 from a top "AIM" position to a lower "VIEW" position. This lever is shown in FIG. 11 mounted in a cylinder 34 and carrying a cam finger 36 which is movable in the "VIEW" position to press an operating button 40 on a rotating slide viewer to present and illuminate for viewing a selected previously prepared film as will be described.

Also, in FIG. 1, a simulated human skull is mounted on a vertical post 42 which is provided with spaced teeth 44 to cooperate with a geared elevator shaft 46 controlled by a crank 48 and mounted in a base column 50. A second vertically shiftable shaft 52 (see also FIG. 10) supports a platform 54 which mounts a simulating X-ray cone 56.

Referring now to FIGS. 7 and 8, just inside the front plate 26 of the housing 20 is a mask plate or collimator 60 which has a circular opening 62, this mask plate being mounted for X—X and Y—Y movement. A rod frame 64 has upper and lower mount tubes 66 which shift laterally on support track rods 68 mounted on the housing 20. Vertical rods 70 and 71 between slide tubes 66 complete the square frame. The mask plate 60 has side slide loops 72 which track on the rods 70.

The vertical position of the mask plate 60 is controlled by a lever 80 (FIG. 9) pivoted on a vertical bracket 82. The forward end of lever 80 is in contact with the bottom of the plate 60 through a roller 82. The rearward end of lever 80 is connected to the bottom end of skull mount post 42. Thus, raising and lowering of the skull and mount will produce an inverse vertical motion of the plate 60.

The X—X motion of the plate 60 is controlled by a wire cable having one end 90 (FIG. 8) attached to the right of frame 64 on vertical rod 70 and another end 92 attached to the left of frame 64 on vertical rod 71. Before following the control cables, the actuators will be described. The vertical support shaft 52 for the cone support 54 is connected below the top panel 94 to one end of a lever 96 mounted below a swing bar 100 which is pivotally mounted on a shaft 102 on an axis $A_1$ at the rear of the housing. The rearward end of lever 96 is attached at 97 to a cable stretched between pulleys 104 and 106 which define a triangle with a third double pulley set comprising pulleys 108 and 110. These pulleys are shown in FIG. 10 on the same axis $A_1$ and diagrammatically in offset position in FIG. 14. Pulleys 104 and 106 are mounted on a triangular frame 111 fastened to the rearward end of lever 100 and pivoted at axis $A_1$.

This cable assembly is completed by front corner pulleys 112 and 114 and a rear corner pulley 116. (In diagram FIG. 14, an extra idler pulley 112A is shown for clarity.) Thus, from end 90, at the mask or collimator frame 64, the cable passes, sequentially, pulleys 116, 108, 104, 106, 110 and 112 and terminates at end 92. Tension springs 120 are interposed in the cable to keep this pulley run taunt.

This above-described pulley set is actuated by an aiming motion or swing of the simulated X-ray cone 56 about the axis $A_2$ of shaft 52. In FIG. 6, these positions are shown at 56a and 56b. The result of any pivotal motion of the X-ray cone is an actuation of lever 96 which moves the cable stretch between pulleys 104 and 106 and thus shifts the cable to move the mask 60 in a lateral response motion.

A second cable assembly is associated with lever 100 and a circular film carrier or tray 120 similar to that manufactured by Eastman Kodak under the trademark "Carousel". This tray is rotatably mounted on an axis $A_3$ on a suitable base 122 and carries a plurality of slide frames 124 similar to that shown in FIG. 2. The film tray is associated with an optical display system shown diagrammatically in FIG. 12. A suitable light source is associated with a focused lens set 126 to illuminate a particular film dropped into the light path by the pressing of button 40. The image reflects from corner mirrors 130 and 132 and is displayed on a translucent screen plate 29.

The selection of the particular screen plate to be illuminated is controlled by the position of the X-ray cone. As illustrated in FIG. 6, this cone on support 54 can be moved bodily in an arc as shown by the extreme positions 56c and 56d. The shaft 52 moves in an arcuate slot 140 in top panel 96 (FIG. 10) which moves lever mount bar 100 about axis $A_1$. Stops 141 and 142 are provided to limit the arcuate movement of bar 100.

An arcuate support plate 144 mounted on angle bar 146 provides a vertical support for the members 96 and 100 and also serves as a guide for a second cable which is fastened to bar 100 at 148. A cable 150 passes over pulley 152, around pulleys 154 and 156, then around the circular tray 120 and secured thereto, thence around pulley 158 and back to a pulley 160 and the fastening point 148.

A diagrammatic view in FIG. 13 illustrates that movement of bar 100 around axis $A_1$ shifts cable 150 and rotates the tray 120 to one of a plurality of positions within the arcuate angle of the multiple slides.

IN THE OPERATION

The multiple slides 124 in the circular tray 120 are formed from actual 8×10" radiographs taken at 1° intervals on the specimen such as a human skull. The radiographs, about 40 in number, are then reproduced on slide films suitable to fit the radial recesses of the tray 120. The skull is reproduced in plastic or other suitable material and mounted on column 42.

In use, the student will position the X-ray cone relative to the simulated skull with the lever 30 in the up "AIM" position. When this is accomplished, the lever is turned to the down "VIEW" position. Assuming that the slide projector device is electrically activated and the light source "on", the button 40 will be depressed by the cam 36 and a specific slide will be delivered to the optical axis and be reproduced on the screen 29. If the subject has been raised too high or too low, the responsive vertical position of the collimator or mask plate 60, by the action of lever 80, will show on the image. The effect will be as shown in FIG. 4, that is, a portion of the collimator will shield the intended image. Similarly, if the X-ray cone has been turned on axis $A_2$, shaft 52, to a greater extent that it should be, then the image will appear, for example, as in FIG. 5. A correct and unshielded view is shown in FIG. 3.

In some embodiments, it may be desirable to cover aperture 62 in mask plate 60 with a sheet of transparent plastic. A small opaque dot 63 is placed on the plastic at the center of aperture 62. The image of this dot appears as a dark spot on the screen when images of radiographs are viewed. This dark spot indicates where the operator directed the center of the beam relative to the teeth under examination and also indicates the relative position of the center of the beam and the film size and position being used (See FIGS. 3, 4, 5).

By viewing the displayed film, the student will be informed as to whether he has properly positioned the X-ray cone. If, for example, he is trying for a view of the space between two particular molars, the prepared films will depict several shots of this particular area, each spaced 1° apart. When the X-ray cone is properly positioned, this gap will show clearly and he will learn how to achieve this in repeated efforts.

In FIGS. 15 to 25, there is diagrammatically illustrated a second embodiment which can be adapted to the use of a larger number of positions utilizing a smaller photographic unit such as a microfiche.

In FIG. 15, a subject is illustrated at P and a vertical line L passes through the center of the mouth of the skull opposite the first molars. An X-ray source S with a cone or tubular collimator C is positioned such that it can take various vertical positions and angles such as the direction F.

With the use of small recording areas, a large number of views may be taken as, for example, 12 different positions vertically in any one vertical plane with, for example, an angle variation of 5° for each exposure. The center of the X-ray beam F will always be directed at the center of the mouth as above defined.

After the prescribed number of shots in any one vertical plane, the subject may be moved 3° about the axis L and another 12 radiographs will be made as before. This process is continued with a 3° rotation of the skull until all the teeth have been radiographed.

These radiographs may then be copied onto a microfiche film with 12 pictures in each column vertically and as many columns circumferentially disposed as are necessary to include all of the radiographs. Each picture in a horizontal row will have been made with a 3° displacement from its adjacent picture and the width of the film must be such that, when the films are joined end to end in a circular band, adjacent radii from the center of a circle to adjacent vertical columns of pictures will form an angle of 3°. Of course, some portions of the band of film where no radiographs were taken will be blank.

In FIGS. 16 to 25, I have illustrated diagrammatically a device for utilizing the reduced radiographs for a teaching instrument.

In FIG. 16, the microfiche are shown incorporated in a rigid hollow drum 200 keyed to a vertical shaft 202 supported in a bearing 204 so that the drum and the shaft must rotate in unison. The shaft 202 is on the center axis of the mouth of a skull 206 or simulated skull mounted on an offset shaft 208. A housing 210 supports bearing 204 and the shaft 202. The drum 200 is mounted to rotate with and shift vertically on shaft 202 so that any individual microfiche can be placed in a position before a lens system 212, mounted outside the drum, which receives illumination from a light source 214 within the drum.

On the right-hand wall of housing 210, as viewed in FIG. 16, is a translucent rear-projection screen 216 behind which is a disc 218 of opaque material movable on an axis 220 and having apertures of various sizes and shapes disposed around the periphery to collimate the projected beam from a particular microfiche before it reaches the screen 216. The dimensions of the various apertures in disc 218 correspond to those of various dental film packs.

An opaque sheet 230, formed preferably of metal, has a circular opening 232 serving as a collimator to control the portion of the image which reaches the screen 216. The circular aperture 232 is preferably covered with a sheet of transparent material which carries a small opaque dot 234 at the center of the aperture. The dark image of this dot on the screen 216 will indicate where the center of the simulated X-ray beam F was directed when a given radiograph aim was made in the simulation device.

In this device, as in the device previously described, the accuracy of the aim, or the positioning of the X-ray cone for a particular view, is reflected in the location of the collimator sheet 230. To this end, there is a mechanically reflective system which provides interaction between the collimator sheet and the various positioning mechanisms.

The simulated X-ray source and cone C is pivotally mounted at 238 as shown in FIG. 16 on a bifurcate yoke 239 of a telescoping support shaft 240 and the center of the cone is considered to simulate the source of the X-rays. A pulley 242 lying in a vertical plane is centered on a horizontal axis through the X-ray source and fixed to the cone. The distal free end of the cone can be moved both to the left and to the right and up and down. When it is moved up and down, it rotates the pulley 242. When it is moved to the left or right, it rotates the support shaft 240 which in turn moves a lever 244 (FIG. 18) to shift the collimator sheet 230 to the left or to the right relative to the screen 216. This is accomplished through idler corner pulleys 246 connected by a cable run 248 anchored to the lever 244 at 250. This system is mounted in the frame support 210 above the lens system in a manner similar to the device previously described. Thus, when the X-ray cone C is moved to the left, the collimator sheet moves to the left. The same composite vertical and horizontal slide system as previously described is used to get the combined motion with separate controls.

The vertical motion of the collimator sheet 230 is controlled in a compound manner by the vertical positioning of the simulation cone C and the angle of tilt. Movement of each can offset or add to the other.

The basic mechanism is comprised of a hollow shaft 260, FIGS. 20 to 25, suitably journalled transversely in housing 210, on which is mounted, for rotation therewith, a small pulley 262 and a double pulley 264. A cam shaped pulley 266 is mounted adjacent the other pulleys on the journalled shaft, but it is free to rotate on the shaft except that it is spring loaded relative to the other pulleys. Both pulley sets 262 and 264, and cam pulley 266, are spring loaded to keep tension on the cables. The reason for the shaped cam 266 lies in the fact that when the cone C is lowered, for example, it must also be moved about the axis 238 so it will continue to aim at the center of the mouth. Thus, the cam periphery must absorb the downward motion of the cable 278 as a result of the direct lowering and further motion of the cable by reason of the clockwise rotation of pulley 242.

The vertical motion of the collimator 230 is controlled by a cable loop 270 shown in FIGS. 23 and 25 in response to various elements of the system. One point of the cable 270 is fastened to a pin 272 mounted on cam pulley 266 and extending axially over the adjacent sheave 264a of pulley 264. This cable passes radially through holes 273 in the pulley 264a, through radial holes 275 in the hub of pulley 264a to the interior of hollow shaft 260, and out the respective ends of the shaft (see FIG. 24) to guide pulleys 274 and 276 above and below the collimator 230 and thence to the collimator itself.

The position of rotation of the cam pulley 266 is determined by the vertical position of the cone axis 238 and by the rotation of the pulley 242 mounted on pivoting end of the cone C as shown in FIGS. 16 and 19. If we view this cam pulley in FIG. 23, we find the pin 272 in a position horizontally aligned with the axis of the pulley assembly and the cone C in the position F. A connecting cable 278 extends from pulley 242 to cam pulley 266. Clockwise rotation of the cone C and the pulley 242 to position F' will cause clockwise rotation of cam 266 to the position shown in FIGS. 19 and 25. Similarly, counterclockwise rotation of cone C toward a downwardly aimed position will cause counterclockwise rotation of cam 266. Thus, if the cone is moved angularly to position F' as shown in FIGS. 19 and 25, the cam pulley 266 and the pin 272 are moved clockwise to the position shown and relative to the pulley sets 264. Assuming no change in the vertical elevation of the cone, this will shift the collimator upwardly by reason of the sliding of the cable loop 270.

The pulley set 264 is also responsive to the vertical movement of the telescoping column 240 which supports the simulated cone C. The pulley set 264 moves with the cam 266 in synchronous fashion as long as the cone C is properly directed toward the center of the mouth. Thus, as viewed in FIG. 23, the fastening point 272 lies midway between radial openings 273 in pulley 264a. If, however, the cone C is not properly directed, the pulley set 264 and the cam 266 will shift relative to each other and this will cause a motion of cable 270 and a displacement of the collimator 230.

Thus, as shown diagrammatically in FIG. 21, the top of column 240 is connected by a cable 280 to the right-hand sheave of pulley 264. Accordingly, if the support column 240 is moved up, the pulley 264 will move counterclockwise. If the support column 240 is moved down, the cable 280 will shift the spring-loaded pulley 264 clockwise.

Thus, the collimator plate is responsive through cable 278 to vertical positioning of the cone center 238 and to pivotal movement of the cone C and the associated pulley 242. As previously indicated, the pulleys 264 will move synchronously with the cam 266 if the cone is directed to the center of the mouth.

The small pulley 262, FIG. 16, is rotatable with pulleys 264 and connected by a cable run 284 to lift bar 282 diametrically disposed above and fastened to the record data drum 200. Thus, the drum moves, for example, to vertical positions 1, 2, or 3 to correspond to vertical positions 1, 2 or 3 of the cone assembly C as illustrated in FIG. 16.

It will thus be seen that in this embodiment an X-ray picture response at the projection screen 216 will be the input of:

(1) The rotational position of the simulated subject 206;
(2) The rotational position of the cone C;
(3) The angle of tilt of the cone C;
(4) The vertical position of the cone C; and
(5) The orientation of the film-dimension-selection disc 216.

A proper positioning of the cone C with respect to the dental array of the skull will show the dot 234 in the middle of screen with no improper masking at the edges. It is desirable for instruction purposes that the viewing screen be illuminated after the student has positioned the cone and the simulated dental array for a particular selected shot which has been assigned. Thus, he can check his skill after the positioning and work on perfecting his X-ray techniques.

It will be recognized that other means may be utilized to accomplish the results embraced by the present invention and that the two embodiments above described in connection with the drawings are exemplary of specific means to practice the invention.

I claim:

1. A method of teaching X-ray techniques which comprises:
   (a) providing a storage bank of individual X-ray shots of a particular object to be examined radiographically, each taken with the X-ray beam directed sequentially at a multiplicity of angles,
   (b) positioning a simulated X-ray source adjacent a representation of said particular portion of the object for a particular X-ray analysis, and
   (c) displaying one of said X-ray shots selected by the positioning of the simulated X-ray source to enable a student to develop skill in such positioning.

2. A method of teaching an X-ray technique which comprises:
   (a) preparing a bank of unit X-ray records of a portion of a particular object to be examined radiographically,
   (b) providing a subject in the form of that particular object,
   (c) providing a display device for selecting and displaying any one of said unit X-ray records individually,
   (d) providing a simulated X-ray source, and
   (e) movably associating said X-ray source and said display device to display an individual X-ray record in response to a positioning of said X-ray source relative to said subject.

3. A teaching device for the development of skill in X-ray techniques which comprises:
   (a) an object subject to radiographic examination,
   (b) a plurality of displayable unit X-ray records derived from X-ray exposures of said object in a multiplicity of incremental varying positions,
   (c) a first means forming an informational storage bank of said plurality of unit records,
   (d) a second means to simulate an X-ray source,
   (e) a third means movably to mount said second means adjacent a representation of said object,
   (f) fourth means to display a single unit record from said storage bank, and
   (g) selector means responsive to the positioning of said second means to position for display a particular single unit record from said storage bank.

4. A teaching device as defined in claim 3 in which said first means comprises a support for a plurality of X-ray negatives movable to any one of a plurality of positions for individual display of a negative, and said fourth means comprises a light, lens and screen system for display of a particular negative.

5. A teaching device as defined in claim 3 in which said first means comprises a carousel type of storage container and a plurality of X-ray negatives in said container positioned for individual display, and said fourth means comprises a light, lens, and screen system for display of a particular negative.

6. A teaching device as defined in claim 5 in which said object and said X-ray source are vertically and rotatably movable and said selector means is operatively associated with said subject and said X-ray source to position said carousel for display of a particular slide in response to the rotative position of each.

7. A teaching device as defined in claim 6 in which a masking plate is positioned relative to said display means having an aperture movable relative to said screen in response to rotation and elevation of said X-ray source.

8. A teaching device as defined in claim 7 in which a selector plate is movably positioned adjacent said screen having a plurality of apertures comparable to various film pack dimensions, each aperture being selectively movable into registry with said light display system.

9. A teaching device as defined in claim 5 in which said X-ray source is mounted on a vertical rotatable shaft and said shaft is connected by means including pulleys in said selector system to rotate said carousel in response to rotative movement of said shaft.

10. A teaching device as defined in claim 3 which includes means for mounting said object for vertical and rotational movement, means for mounting said simulated X-ray source for vertical and rotational movement, said selector means being responsive to the positioning of said object and said X-ray source.

11. A teaching device as defined in claim 3 in which said first means comprises a cylindrical drum composed of horizontal and vertical banks of X-ray films, and said display system comprises a light source, lens, and display screen.

12. A teaching device as defined in claim 11 in which said subject and said X-ray source are each vertically and rotatably movable, and said cylindrical drum is responsive rotatably and vertically through said selector means to position a particular single unit record in said display system.

13. A teaching device as defined in claim 11 in which said subject is directly associated with said drum on a vertical shaft so that the drum and the subject rotate together, and said drum is responsive vertically on said shaft to a selector means associated with said third means.

14. A teaching device as defined in claim 11 in which said third means comprises a vertically movable column, rotatable means responsive to the vertical position of said column, a pulley responsive to the angle of tilt of said X-ray source, a rotatable means responsive to the rotation of said pulley, and means responsive to both said rotatable means to elevate or lower said drum to a responding position.

15. A teaching device as defined in claim 14 in which a masking plate is positioned relative to said display means having an aperture movable vertically relative to said screen in response to the angle of tilt and the elevation of said X-ray source.

16. A teaching device as defined in claim 15 in which said X-ray source is mounted on a rotatable shaft, and means to connect said shaft and said masking plate to control the horizontal position of said plate in response to the rotation of said rotatable shaft.

17. A teaching device as defined in claim 11 in which the third means comprises a vertically shiftable shaft having a pulley at the top thereof on a horizontal axis, said pulley being responsive to the tilt relative to horizontal of said X-ray source, and said shaft being rotatably responsive to the angle of rotation on a vertical axis of said X-ray source, a masking plate having a display opening positioned relative to said display means movable horizontally and vertically, a plurality of pulleys on a common axis responsive respectively to the vertical position of said shaft, and to the angle of tilt of said X-ray source, to position vertically said drum and said masking plate relative to said display system for a display of a single X-ray film, and a means responsive to the rotative position of said shaft to position said masking plate horizontally relative to said display system.

18. A teaching device as defined in claim 17 in which said pulleys are resiliently biased to move together, the one of said pulleys which is responsive to the tilt of said X-ray source having a larger peripheral pulley surface than the other of said pulleys to compensate for vertical adjustment of said X-ray source and the tilt relative to horizontal of said X-ray source.

* * * * *